UNITED STATES PATENT OFFICE.

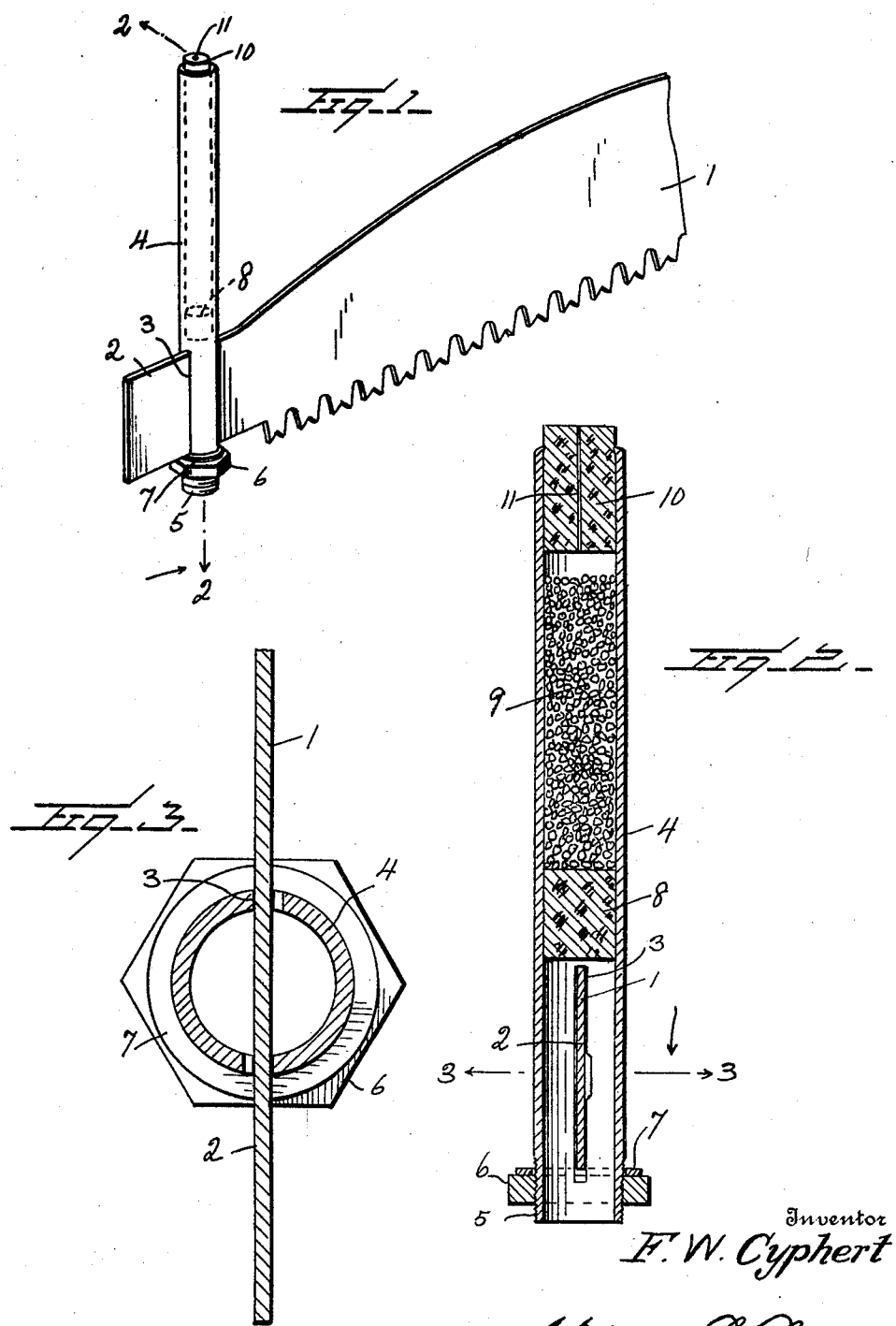

FRANK W. CYPHERT, OF CURLLSVILLE, PENNSYLVANIA.

HANDLE FOR CROSSCUT-SAWS.

1,318,481.  Specification of Letters Patent.  Patented Oct. 14, 1919.

Application filed May, 3, 1919. Serial No. 294,550.

*To all whom it may concern:*

Be it known that I, FRANK W. CYPHERT, a citizen of the United States, residing at Curllsville, in the county of Clarion and State of Pennsylvania, have invented certain new and useful Improvements in Handles for Crosscut-Saws, of which the following is a specification, reference being had to the accompanying drawings.

This invention relates to an improved handle for use in connection with cross-cut saw, and the invention aims to provide a handle, which is tubular, and adapted to contain heating means, whereby the handle may be kept warm in extreme cold weather, when sawing and felling trees in the forest.

The invention further aims to provide a metallic tubular handle having means for connection to a cross-cut saw blade, and adapted to receive a heating means, such as carbid and requisite moisture, whereby sufficient heat may be generated to keep the handle warm during extreme cold weather.

While the design and construction as present illustrated and set forth is deemed preferable, it is obvious that as a result of a reduction of the invention to a more practical form for commercial purposes, the invention may be susceptible to changes, and the right to these changes is claimed, provided they are comprehended within the scope of what is claimed.

The invention comprises further features and combination of parts, as will be hereinafter set forth, shown in the drawings and claimed.

In the drawings:

Figure 1 is a view in perspective of a portion of a cross-cut saw, showing the handle applied.

Fig. 2 is a vertical sectional view through the handle showing the saw blade clamped in one end thereof, and showing the carbid within the handle, and suitable corks to hold the carbid in proper place, whereby through the medium of the chemical action of moisture on the carbid, heat will be generated to keep the handle warm.

Fig. 3 is a cross-sectional view on line 3—3 of Fig. 2.

Referring to the drawings, 1 designates a saw blade, each end of which is provided with a portion 2, to engage the diametrically oppositely arranged elongated slots 3 of one end of a metallic tubular handle 4. These slots are in registration, so that the portion 2 of the saw blade will pass therethrough. The lower end of the handle is threaded at 5, for the reception of a nut 6. A washer 7 is interposed between the nut and the lower edge of that portion of the saw blade engaging through the slots. Obviously by tightening up the nut, the washer will contact with the lower edge of the saw blade, and clamp the same securely in the slots. The handle may be constructed from any suitable tubular piping, and positioned on the interior of the handle at a point adjacent the upper ends of the slots is a cork or other suitable wad 8, thereby forming a bottom to support a requisite supply of carbid 9 in the handle. Inserted in the upper end of the tubular handle is a second cork or wad or stopper 10, to retain the carbid in position. However, before depositing the carbid in the handle, the inner surface of the handle is thoroughly moistened, possibly by depositing a small quantity of snow therein, or by depositing a small quantity of water therein. After so moistening the inner surface of the handle carbid is placed in the handle. The upper cork or stopper or wad is provided with a very small orifice 11, so as to permit the gradual escape of gas that is generated in the handle. However, it is a well known principle that the contact of moisture with carbid, and as herein disclosed is such as to generate heat, the aim being to keep the handle thoroughly heated in cold weather, particularly while in the forest sawing and felling trees. As the moisture is consumed the upper cork or plug may be removed, and additional moisture may be allowed to enter or may percolate through the small orifice of the upper cork without removing said cork.

The invention having been set forth, what is claimed as new and useful is:

1. In a saw blade handle, the combination with a saw blade, of a tubular handle open at both ends, one end of the handle having diametrically opposite elongated slots for the reception of one end of the saw blade, the slotted end of the handle having its extremity threaded, means engaging the threads for clamping the saw blade end in said slots.

2. In a saw blade handle, the combination with a saw blade, of a tubular handle open at both ends, a plug arranged in the handle at a point between the ends thereof, a second plug having an elongated orifice arranged in the handle at one end and spaced from the first plug, thereby forming a compartment adapted for the reception of carbid to be moistened, whereby heat may be generated for heating the handle, one end of the handle having diametrically opposed elongated slots for the reception of one end of the saw blade, the slotted end of the handle having its extremity threaded, and means engaging the threads for clamping the saw blade end in said slots.

3. In a saw blade handle, the combination with a saw blade, of a tubular handle having a compartment therein for the reception of carbid to be moistened, to generate heat for heating the handle, one end of the handle having diametrically opposite elongated slots for the reception of one end of a saw blade, the slotted end of the handle having its extremity threaded, a washer on the threaded end in contact with the saw blade end, and a nut engaging the threads for clamping the washer against the saw blade end in said slots.

In testimony whereof I hereunto affix my signature in the presence of two witnesses.

FRANK W. CYPHERT.

Witnesses:
  F. C. McEwen,
  John Griffith.

Copies of this patent may be obtained for five cents each, by addressing the "Commissioner of Patents, Washington, D. C."